United States Patent
Leo, Sr. et al.

(10) Patent No.: US 10,060,556 B2
(45) Date of Patent: Aug. 28, 2018

(54) WATER PIPE RETAINER

(71) Applicants: Artil A. Leo, Sr., Birmingham, MI (US); Dan Allor, South Lyon, MI (US)

(72) Inventors: Artil A. Leo, Sr., Birmingham, MI (US); Dan Allor, South Lyon, MI (US)

(73) Assignee: Spider Clip, L.L.C., New Hudson, MI (US)

( * ) Notice: Subject to any disclaimer, the term of this patent is extended or adjusted under 35 U.S.C. 154(b) by 5 days.

(21) Appl. No.: 15/615,519

(22) Filed: Jun. 6, 2017

(65) Prior Publication Data

US 2017/0350539 A1    Dec. 7, 2017

Related U.S. Application Data

(60) Provisional application No. 62/346,239, filed on Jun. 6, 2016.

(51) Int. Cl.
| | |
|---|---|
| *F16L 3/24* | (2006.01) |
| *F16L 5/00* | (2006.01) |
| *F16L 3/237* | (2006.01) |
| *F16L 3/13* | (2006.01) |
| *E04C 3/32* | (2006.01) |

(52) U.S. Cl.
CPC ............... *F16L 5/00* (2013.01); *F16L 3/13* (2013.01); *F16L 3/237* (2013.01); *E04C 3/32* (2013.01)

(58) Field of Classification Search
CPC .............. F16L 3/13; F16L 3/237; F16L 3/223
USPC ........... 248/72, 68.1, 74.2, 62, 63; 174/68.1, 174/84 C
See application file for complete search history.

(56) References Cited

U.S. PATENT DOCUMENTS

| | | |
|---|---|---|
| 2,663,895 A | 12/1953 | Petri |
| 2,897,533 A | 8/1959 | Bull |
| 2,937,834 A | 5/1960 | Orenick |
| 3,164,054 A | 1/1965 | Biesecker |
| 3,285,551 A | 11/1966 | Tschanz |
| 3,518,359 A | 6/1970 | Trimble |
| 3,788,655 A | 1/1974 | Hathaway |
| 3,875,843 A | 4/1975 | Maeda et al. |

(Continued)

FOREIGN PATENT DOCUMENTS

| | | |
|---|---|---|
| CA | 2157090 | 3/1996 |
| DE | 1903060 | 7/1969 |

(Continued)

OTHER PUBLICATIONS

International Search Report for PCT Application No. PCT/US2017/036183, dated Oct. 6, 2017.

*Primary Examiner* — Todd M Epps
(74) *Attorney, Agent, or Firm* — Carlson, Gaskey & Olds, P.C.

(57) ABSTRACT

A retainer for securing conduit or wire to an opening in metal stud includes a pair of outer retaining portions for securing the retainer to the metal stud. Each outer retaining portion includes a groove for receiving an edge of a panel of the metal stud. An inner retaining portion includes a base connecting the pair of outer retaining portions to one another. The inner retaining portion further includes a pair of retention members defining a retention area therebetween in which a conduit can be secured. Each retention member includes a flexible arm. Each of the outer retaining portions extends away from the base to a free end.

21 Claims, 7 Drawing Sheets

(56) References Cited

U.S. PATENT DOCUMENTS

| | | | |
|---|---|---|---|
| 4,137,602 A | 2/1979 | Klumpp, Jr. | |
| 4,299,363 A | 11/1981 | Datschefski | |
| 4,407,042 A | 10/1983 | Schramme et al. | |
| 4,550,451 A | 11/1985 | Hubbard | |
| 4,675,937 A | 6/1987 | Mitomi | |
| 4,685,173 A | 8/1987 | Pavur | |
| 4,706,999 A | 11/1987 | Hynes | |
| 5,183,207 A | 2/1993 | Steinberg et al. | |
| 5,287,664 A | 2/1994 | Schiller | |
| 5,488,198 A | 1/1996 | Kramer | |
| 5,537,714 A | 7/1996 | Lynch, Jr. et al. | |
| 5,626,316 A | 5/1997 | Smigel | |
| 5,627,342 A | 5/1997 | Kramer | |
| 5,653,147 A | 8/1997 | Kelley et al. | |
| 5,950,381 A | 9/1999 | Stansbie | |
| 6,088,876 A | 7/2000 | Daoud | |
| 6,598,835 B2 | 7/2003 | Minnick | |
| 6,675,439 B2 | 1/2004 | Hashimoto | |
| 6,901,627 B2 | 6/2005 | Uchida | |
| 7,011,277 B2 * | 3/2006 | Mizukoshi | F16L 3/223 248/68.1 |
| 7,131,170 B2 * | 11/2006 | Weaver | A46B 17/02 24/545 |
| 7,222,394 B2 | 5/2007 | Gardner | |
| 7,608,782 B2 * | 10/2009 | Hill | H01R 4/48 174/84 C |
| 7,658,350 B2 * | 2/2010 | Bauer | F16L 3/223 24/458 |
| 7,930,800 B1 | 4/2011 | Castrale et al. | |
| 7,963,498 B2 | 6/2011 | Seymour et al. | |
| 8,701,246 B2 | 4/2014 | Allen | |
| 8,973,216 B1 | 3/2015 | Ramirez | |
| 2002/0038492 A1 | 4/2002 | Hashimoto | |
| 2004/0144897 A1 * | 7/2004 | Maruyama | F16B 21/071 248/68.1 |
| 2006/0200936 A1 | 9/2006 | Gardner | |
| 2008/0067294 A1 | 3/2008 | Heller et al. | |
| 2010/0139035 A1 | 6/2010 | Magennis et al. | |
| 2013/0146720 A1 * | 6/2013 | Meyers | F16L 3/223 248/68.1 |

FOREIGN PATENT DOCUMENTS

| | | |
|---|---|---|
| EP | 0076578 | 4/1983 |
| GB | 2451426 | 2/2009 |

* cited by examiner

WATER PIPE RETAINER

BACKGROUND

Metal studs are often used in new construction or remodeling instead of wood studs. The metal studs are sheet metal formed into a stud shape. Some metal studs include a front panel, with two side panels extending perpendicularly from side edges of the front panel. The front panel may have an opening for routing wires and/or conduit (such as water pipes) through the metal studs. Currently, a grommet must be installed in each of the openings through which a conduit or wire is routed. The grommet is secured by screws in a time-consuming process.

SUMMARY

A retainer according to one embodiment disclosed herein more quickly and easily secures conduit or wire to an opening in metal stud. The retainer includes a pair of outer retaining portions for securing the retainer to the metal stud. Each outer retaining portion includes a groove for receiving an edge of a panel of the metal stud, such as via a snap-fit. The grooves secure the retainer to the metal stud.

An inner retaining portion of the retainer includes a base connecting the pair of outer retaining portions to one another. The inner retaining portion further includes a pair of retention members defining a retention area therebetween in which a conduit can be secured. Each retention member includes a flexible arm.

The retainer may include another pair of retention members for securing another conduit or cable to the retainer. The retainer may be molded as a single piece of plastic and may snap-fit into the opening in the metal stud for quick installation.

DETAILED DESCRIPTION OF A PREFERRED EMBODIMENT

Figure 1:
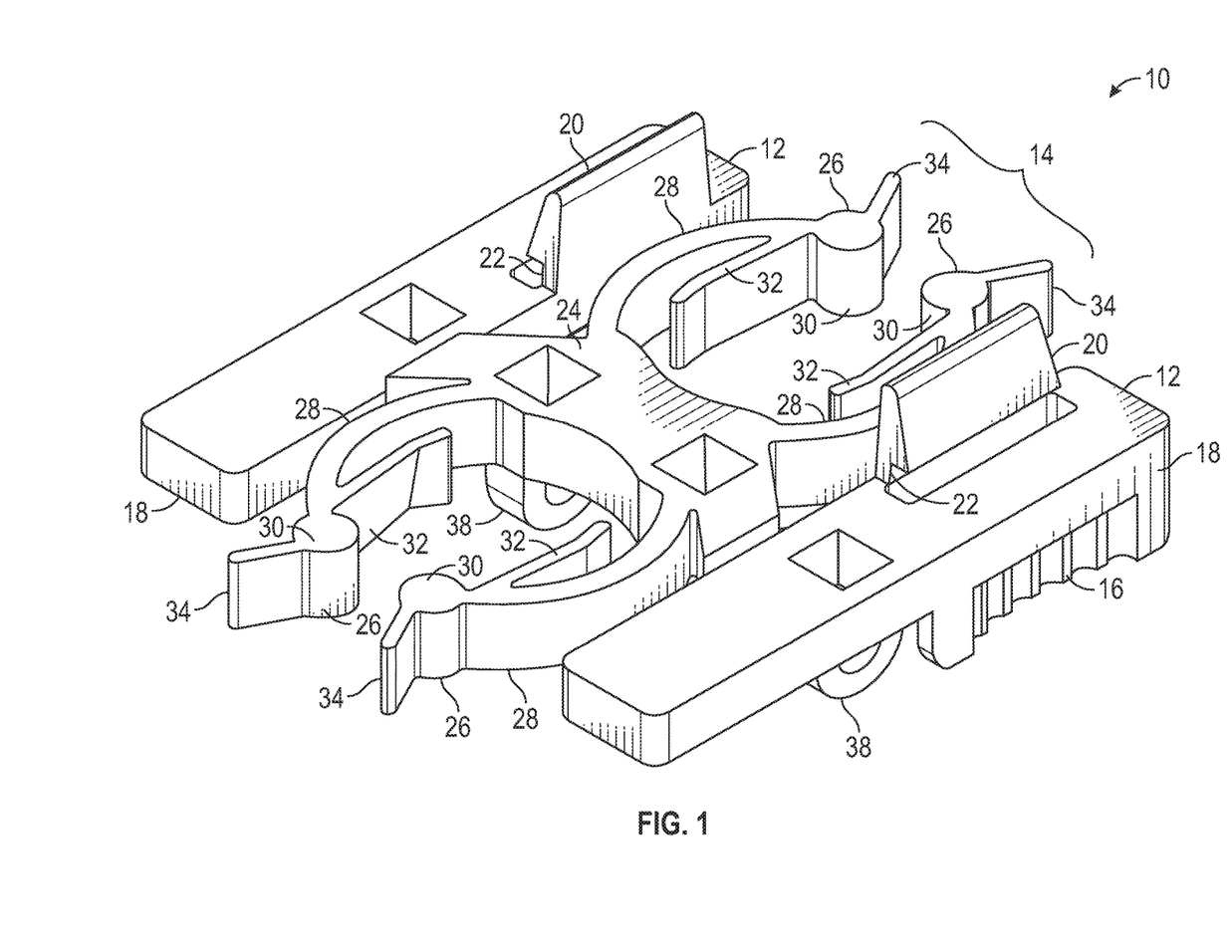
FIG. 1 is a perspective view of a retainer according to one embodiment.

A retainer 10 according to one embodiment is shown in FIG. 1. The example retainer 10 is molded as a single piece of plastic and includes a pair of outer retaining portions 12 and an inner retaining portion 14 between the outer retaining portions 12. The outer retaining portions 12 each include a gripping portion 16 protruding forward of a mid-portion 18. A tapered snap 20 protrudes rearward from the mid-portion 18 and defines a groove 22 between the tapered snap 20 and the mid-portion 18. The gripping portion 16 may be concave and be textured, such as corrugations or ribs.

The outer retaining portions 12 are generally elongated and parallel to one another and secured to one another by a base 24. The base 24 connects to an inner surface of each outer retaining portion 12 generally offset from the middle of each outer retaining portion 12, leaving two opposite free ends of each outer retaining portion 12. In this manner, the outer retaining portions 12 can pivot about the connections to the base 24 in response to the compression of the gripping portions 16. Together, the base 24 and outer retaining portions 12 provide generally an "H" shape.

Extending from opposite sides of the base 24 are two pair of flexible retention members 26. Each retention member 26 includes a flexible curved arm 28 extending from the base 24 to define a retention area between each pair of retention members 26. At outer ends of each curved arm 28 is a cylindrical contact member 30, which provides a rounded surface for engaging a conduit being pressed into the retention area. A retention finger 32 projects from each cylindrical contact member 30 back toward the base 24 within the retention area. A guide tab 34 projects outward at an angle from each cylindrical contact member 30 to guide a conduit being pressed into the retention area.

A plurality of loops 38 project from the base 24 and the mid-portions 18 of the outer retaining portions 12. The loops 38 project forward of the mid-portion 18 of the outer retaining portion 12.

Figure 2:
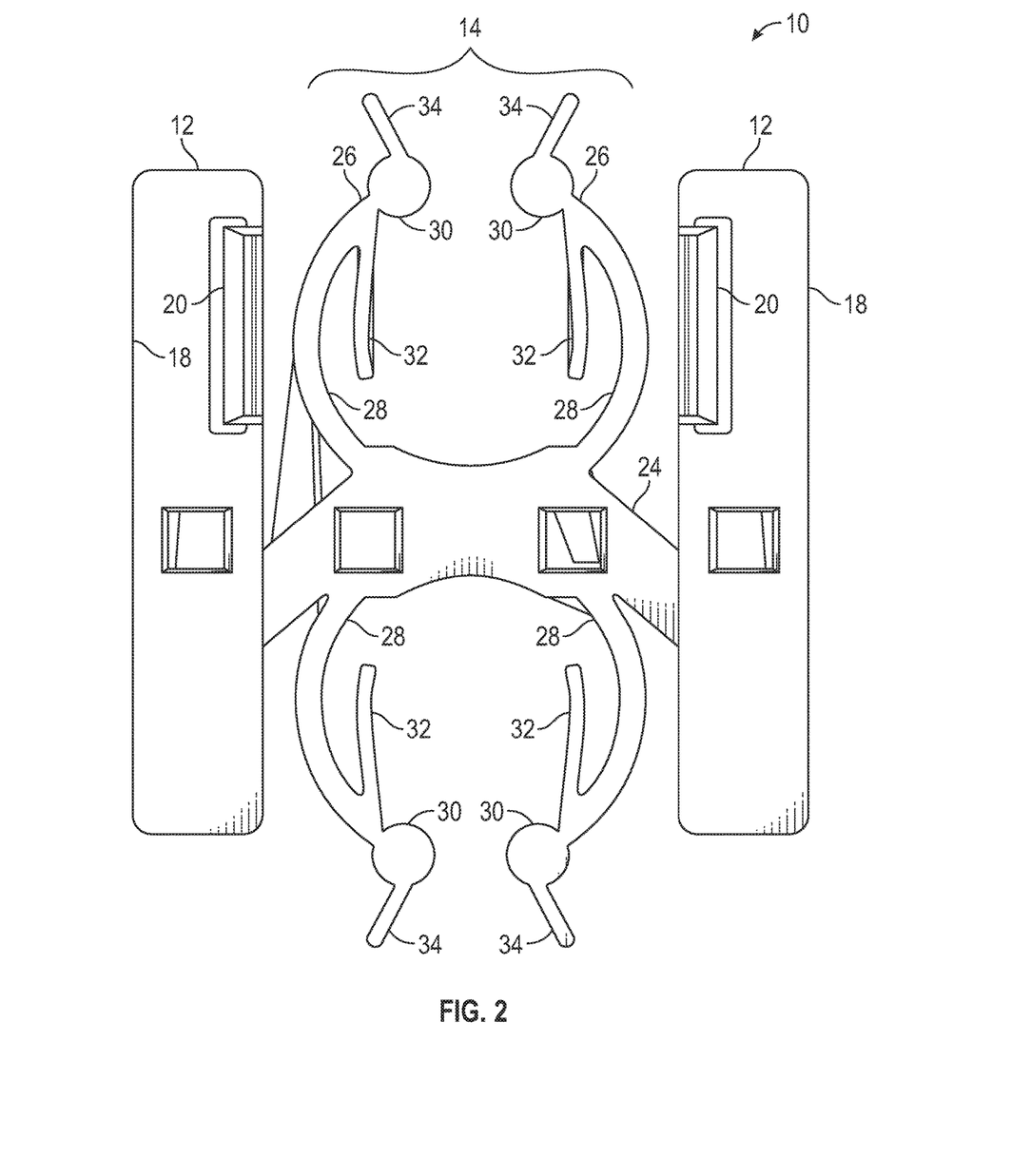
FIG. 2 is a rear view of the retainer of FIG. 1.

FIG. 2 is a rear view of the retainer 10. As shown, the base 24 may angle downward (i.e. away from the snaps 20) as it extends from a central portion toward the outer retaining portions 12.

Figure 3:
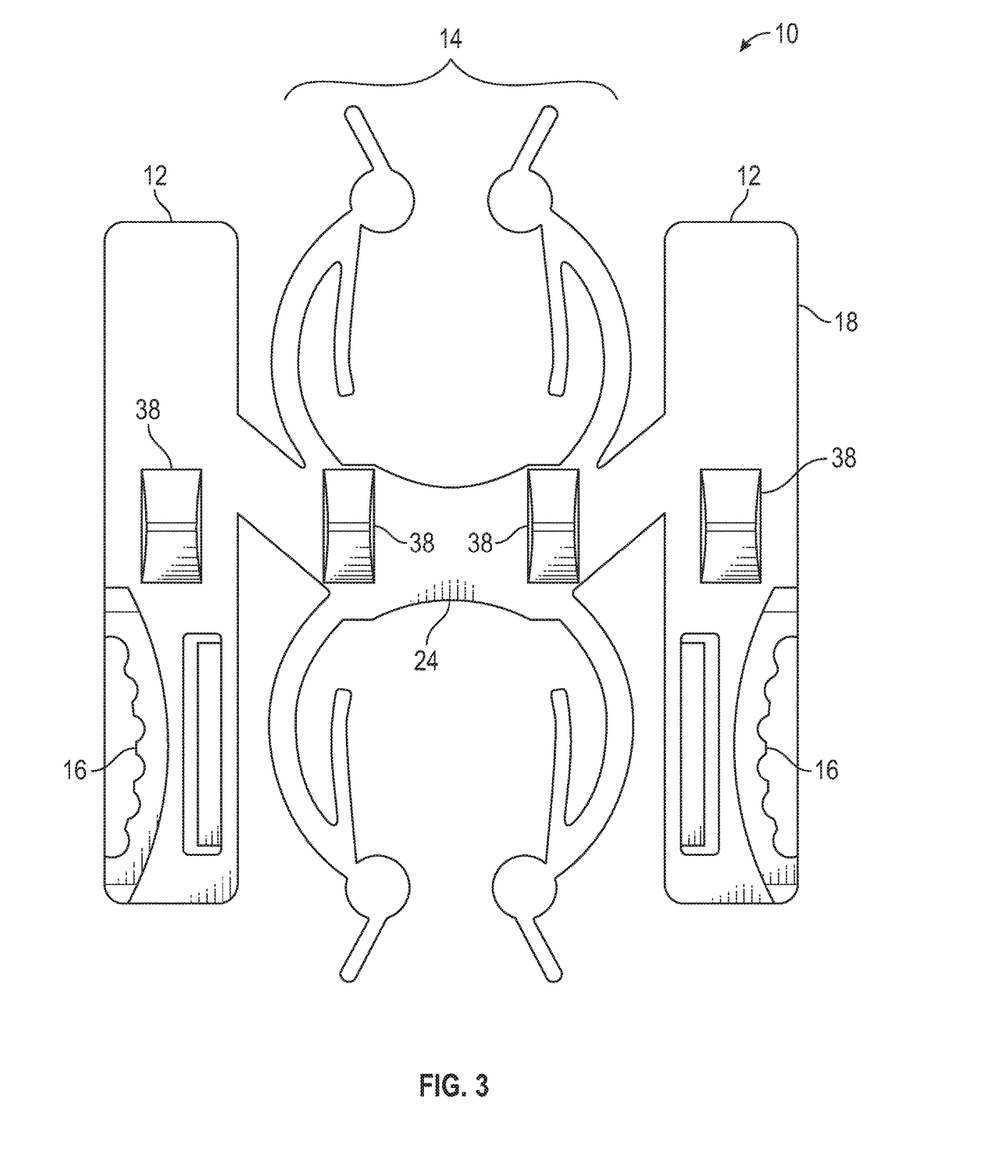
FIG. 3 is a front view of the retainer of FIG. 1.

FIG. 3 is a front view of the retainer 10. The four loops 38 are aligned, with one loop 38 on each outer retaining portion 12 and two on the base 24. Outer surfaces of the gripping portions 16 are concave, curving inward toward one another.

Figure 4:
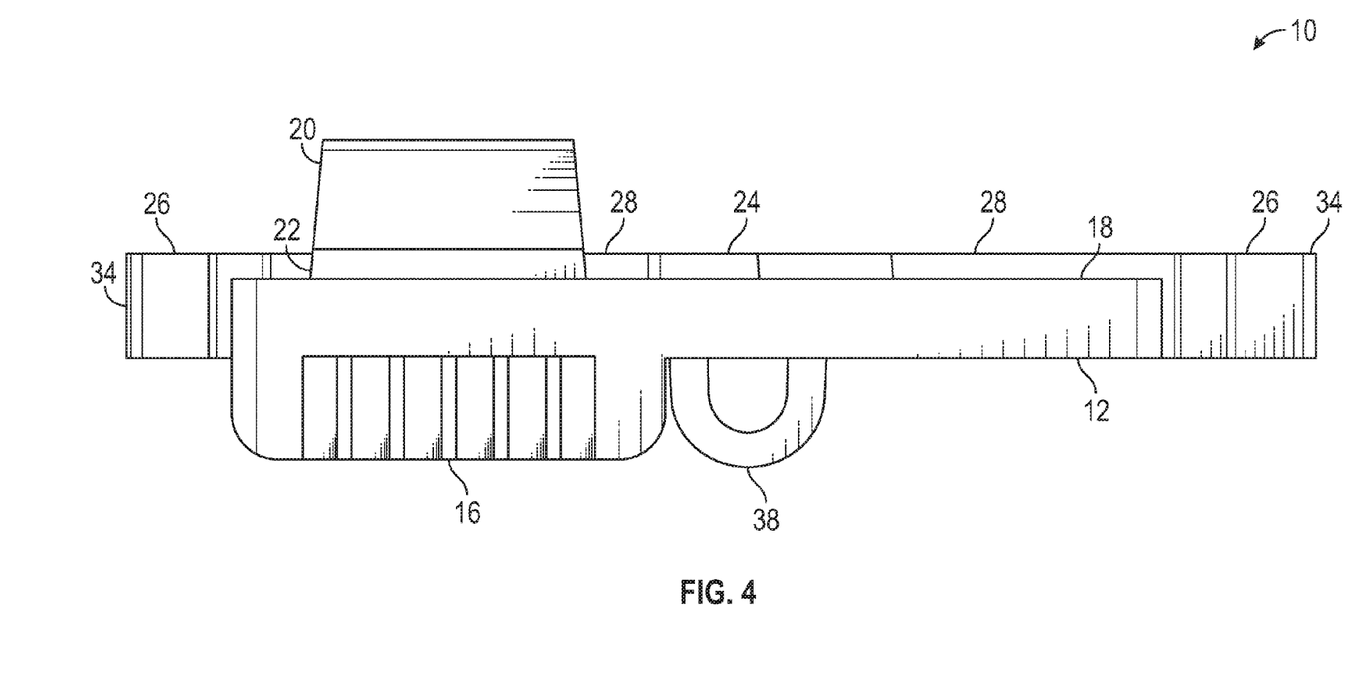
FIG. 4 is a side view of the retainer of FIG. 1.

FIG. 4 is a side view of the retainer 10. The central portion of the base 24 protrudes rearwardly more than do the mid-portions 18 of the outer retaining portions 12. The retention members 26 may be offset rearwardly of the mid-portion 18 of the outer retaining portions 12, such that the retention members 26 partially align with or overlap the grooves 22. As shown, the loops 38 are offset from the gripping portions 16 so that there is clear access to the loops 38.

Figure 5:
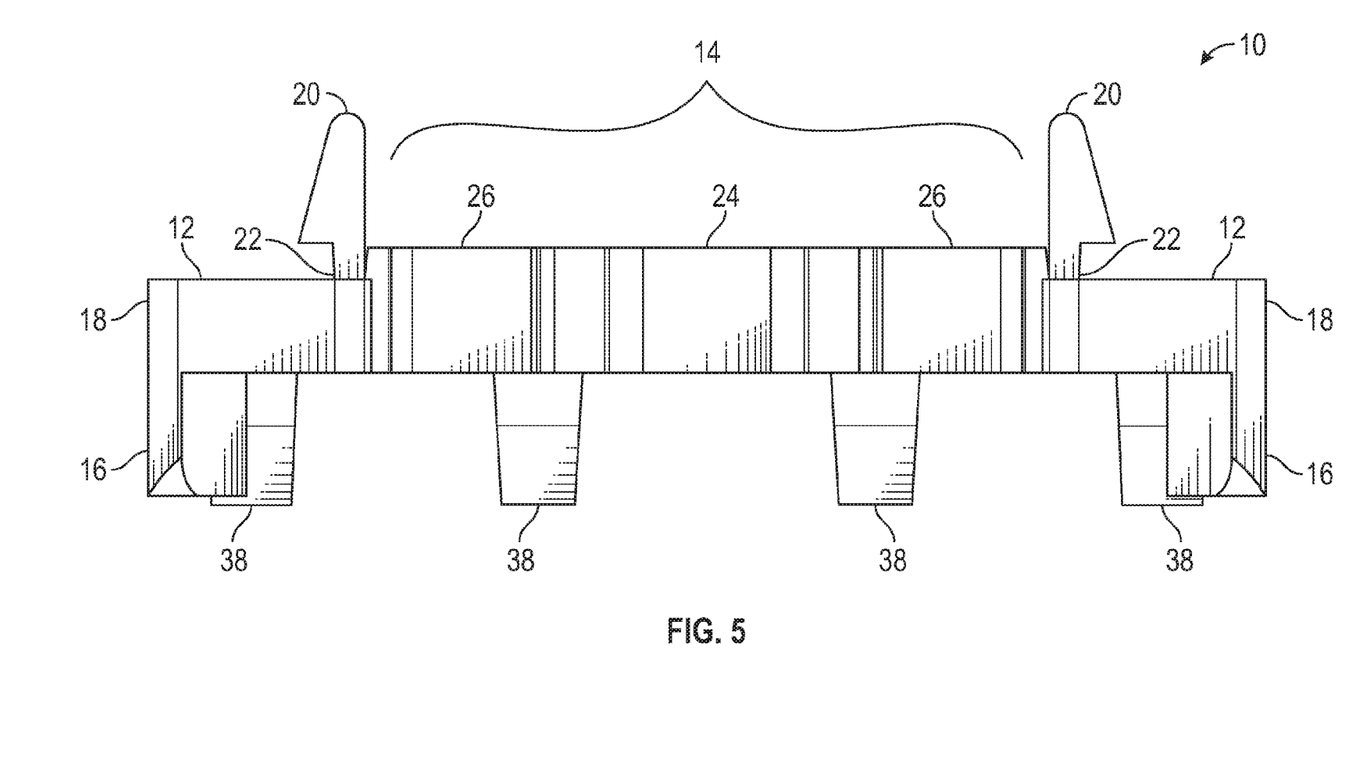
FIG. 5 is a top view of the retainer of FIG. 1.

FIG. 5 is a top view of the retainer 10. The snaps 20 define grooves 22 opening outwardly of the retainer 10. The rear surface of the mid-portions 18 of the outer retaining portions 12 does not project rearwardly of the grooves 22.

Figure 6:
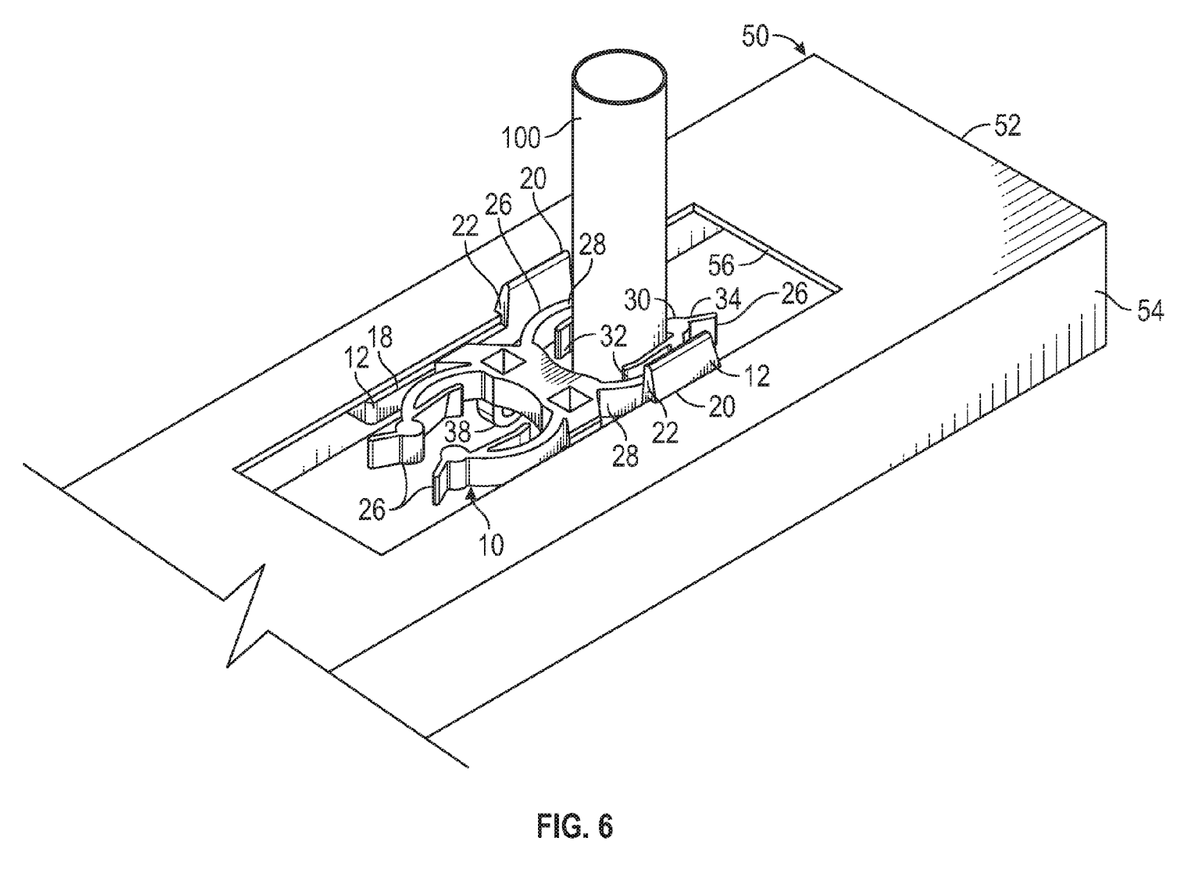
FIG. 6 is a perspective view of FIG. 1 installed in metal stud and securing a conduit thereto.

FIG. 6 is a perspective view of an example of a metal stud 50 having a front panel 52 and side panels 54 extending perpendicularly therefrom. A knockout or opening 56 is formed in the front panel 52. The retainer 10 may be secured in the opening 56 in the front panel 52 of the metal stud 50. To install the retainer 10, the gripping portions 16 (FIG. 1) of the retainer 10 are squeezed toward one another while inserting the snaps 20 through the opening 56 until the front panel 52 stops in contact with the mid-portions 18 of the outer retaining portions 12. In this position, the grooves 22 are aligned with the front panel 52. When the gripping portions 16 are released, they are resiliently biased back outward against the front panel 52 and the front panel 52 is received securely in the grooves 22. This secures the retainer 10 in the metal stud 50.

The retainer 10 can then receive a conduit or pipe 100 within the inner retaining portion 14. The pipe 100 can be snap-fit through the guide tabs 34, past the cylindrical contact members 30 and into the retention area between the retention fingers 32. The pipe 100 is held in place by the retention fingers 32 and the cylindrical contact members 30 of the retention members 26. The other pair of retention members 26 can secure another conduit or wire. The retention members 26 are between the conduit or wire and the edges of the front panel 52. The loops 38 can be used to retain wire through the loops.

Figure 7:
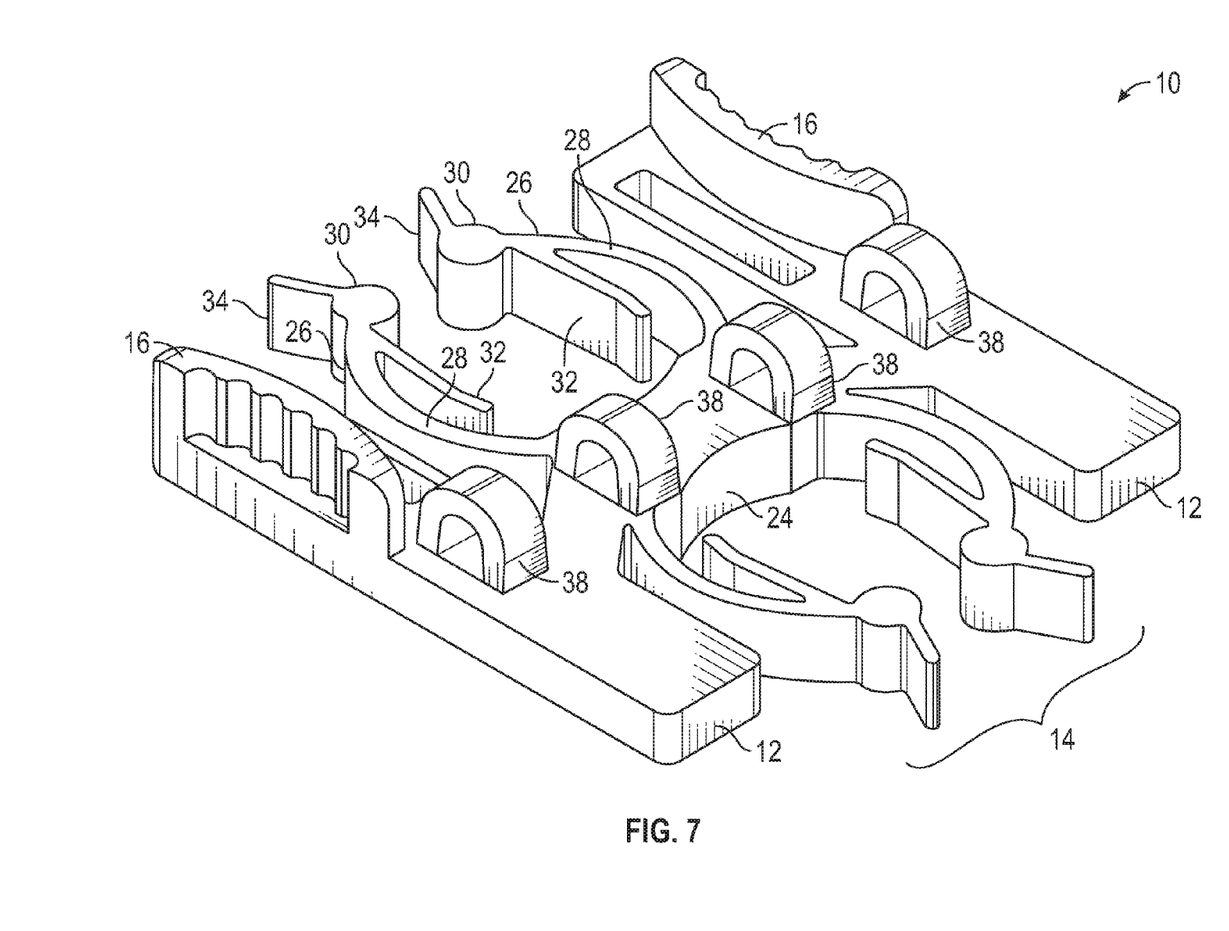
FIG. 7 is a bottom perspective view of the retainer of FIG. 1.

The retainer 10 is inexpensive, but quick and easy to install. The retainer 10 will securely hold conduit of various sizes or wire of various sizes in the metal stud 50. FIG. 7 is a bottom perspective view of the retainer of FIG. 1.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope. For example, one of the pairs of retention members 26 could be sized differently from the other, to provide sizing options.

What is claimed is:

1. A retainer for securing conduit to an opening in a metal stud, the retainer comprising:
   a pair of outer retaining portions for securing the retainer to the metal stud; and
   an inner retaining portion for securing a conduit within the retainer, the inner retaining portion formed integrally with the outer retaining portions, the inner retaining portion including a pair of retention members defining a retention area therebetween in which the conduit can be secured, the inner retaining portion including a pair of flexible arms into which the conduit can be snap-fit, each retention member including one of the pair of flexible arms, wherein each flexible arm is a flexible curved arm and each retention member further includes a retention finger extending inward from an outer end of the flexible curved arm, wherein the inner retaining portion is between the outer retaining portions.

2. The retainer of claim 1 wherein the inner retaining portion further includes a base connecting the at least one outer portion to the retention members, wherein each retention finger extends from the outer end of the flexible curved arm toward the base.

3. The retainer of claim 2 wherein each retention member further includes a guide tab extending outward from the outer end of the flexible curved arm.

4. A retainer for securing conduit to an opening in a metal stud, the retainer comprising:
   a pair of outer retaining portions for securing the retainer to the metal stud, wherein each outer retaining portion includes a tapered snap adjacent a groove for receiving a panel of the metal stud; and
   an inner retaining portion for securing a conduit within the retainer, the inner retaining portion formed integrally with the outer retaining portions, the inner retaining portion including at least one flexible arm into which the conduit can be snap-fit, wherein the inner retaining portion is between the outer retaining portions.

5. The retainer of claim 4 wherein the pair of retention members is a first pair of retention members, the inner retaining portion further including a second pair of retention members extending from the base in a direction opposite that of the first pair of retention members.

6. The retainer and metal stud of claim 5 in combination with a conduit secured in the retention area by the pair of retention members.

7. The retainer of claim 4 further including a plurality of integral loops protruding from the base.

8. The retainer of claim 4 in combination with a metal stud having a panel, wherein the panel is received in the grooves of the outer retaining portions.

9. A retainer for securing conduit or wire to an opening in a metal stud, the retainer comprising:
   a pair of outer retaining portions for securing the retainer to the metal stud, each outer retaining portion including a groove for receiving an edge of a panel of the metal stud, wherein the grooves define a first plane; and
   an inner retaining portion including a base connecting the pair of outer retaining portions to one another, the inner retaining portion further including a pair of retention members defining a retention area therebetween in which a conduit oriented perpendicular to the first plane can be secured, each retention member including a flexible arm, the flexible arms being flexible in a second plane parallel to the first plane, each of the outer retaining portions extending away from the base to a free end.

10. The retainer of claim 9 wherein the flexible arm of each retention member is curved and wherein each retention member further includes a retention finger extending from an outer end of the flexible curved arm toward the base.

11. The retainer of claim 10 wherein each retention member further includes a guide tab extending outward from the outer end of the flexible curved arm.

12. The retainer of claim 9 wherein each outer retaining portion includes a tapered snap adjacent the groove for receiving the panel of the metal stud.

13. The retainer of claim 12 further including a plurality of integral loops protruding from the base.

14. The retainer of claim 9 in combination with a metal stud having a panel, wherein the panel is received in the grooves of the outer retaining portions.

15. The retainer and metal stud of claim 14 in combination with a conduit secured in the retention area by the pair of retention members, wherein the conduit is perpendicular to the first plane and the panel of the metal stud.

16. A retainer for securing conduit or wire to an opening in a metal stud, the retainer comprising:
   a pair of outer retaining portions for securing the retainer to the metal stud, each outer retaining portion including a groove for receiving an edge of a panel of the metal stud;
   an inner retaining portion including a base connecting the pair of outer retaining portions to one another, the inner retaining portion further including a pair of retention members defining a retention area therebetween in which a conduit can be secured, each retention member including a flexible arm, each of the outer retaining portions extending away from the base to a free end; and
   a plurality of integral loops protruding from the base.

17. The retainer of claim 16 wherein the inner retaining portion is between the pair of outer retaining portions.

18. The retainer of claim 17 wherein the grooves define a first plane and wherein the pair of retention members are configured to secure a conduit extending in a direction perpendicular to the first plane.

19. A retainer for securing conduit or wire to an opening in a metal stud, the retainer comprising:
   at least one outer retaining portion for securing the retainer to the metal stud; and
   an inner retaining portion for securing a conduit or wire within the retainer, the inner retaining portion and the outer retaining portion integrally molded as a single piece of plastic, wherein the inner retaining portion includes a pair of retention members defining a retention area therebetween in which a conduit can be secured, each retention member including a flexible curved arm, each retention member further including a retention finger extending inward from an outer end of the flexible curved arm.

20. The retainer of claim 19 wherein the at least one outer retaining portion includes a pair of outer retainer portions, and the inner retaining portion is between the pair of outer retaining portions.

21. The retainer of claim 19 wherein the grooves define a first plane and wherein the pair of retention members are configured to secure the conduit oriented in a direction perpendicular to the first plane.

\* \* \* \* \*